Feb. 2, 1965
J. REEF
3,167,867
GEAR TEETH CHECKING GAGE
Filed July 25, 1962
2 Sheets-Sheet 1
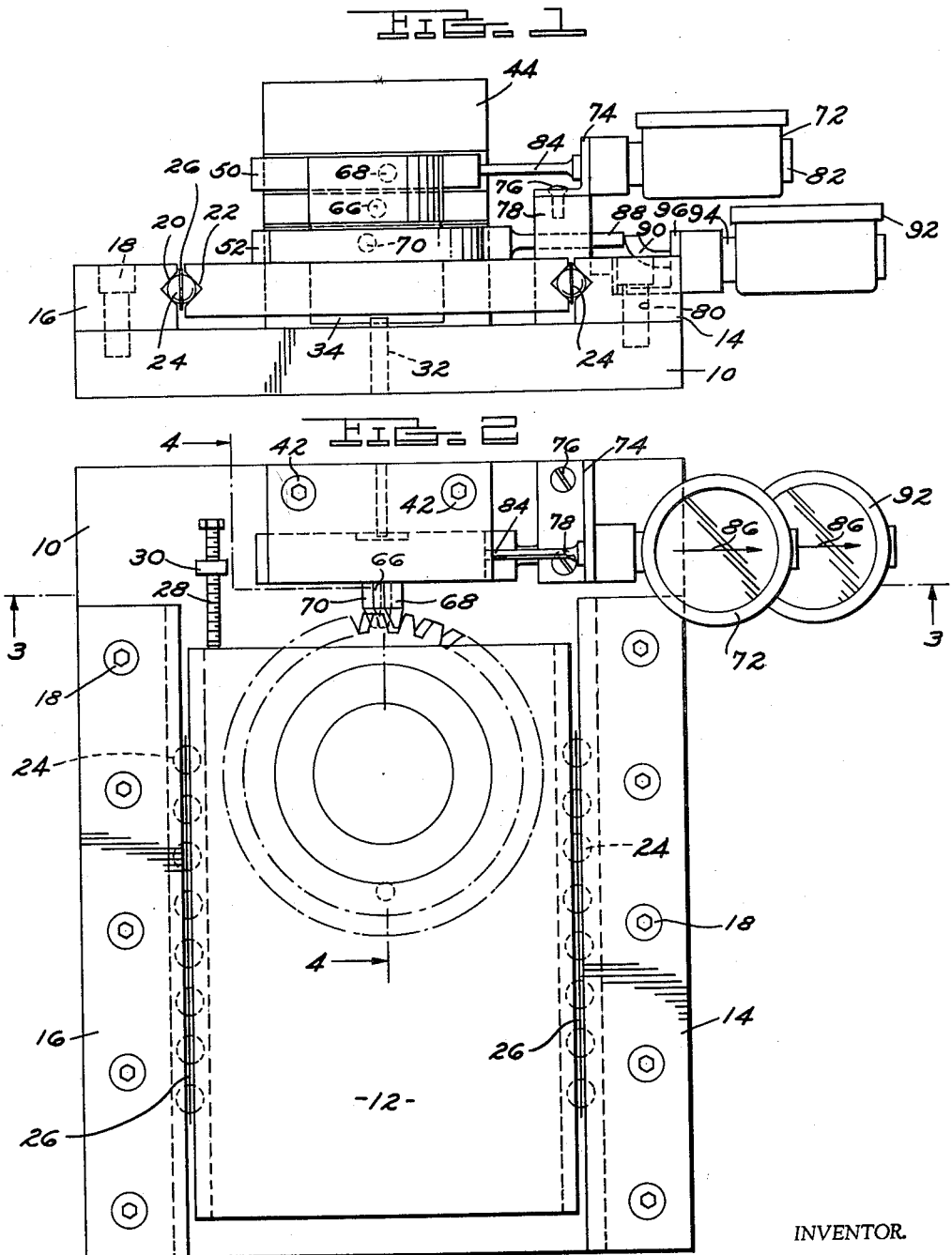
INVENTOR.
JAN REEF
BY
Burton & Parker
ATTORNEYS

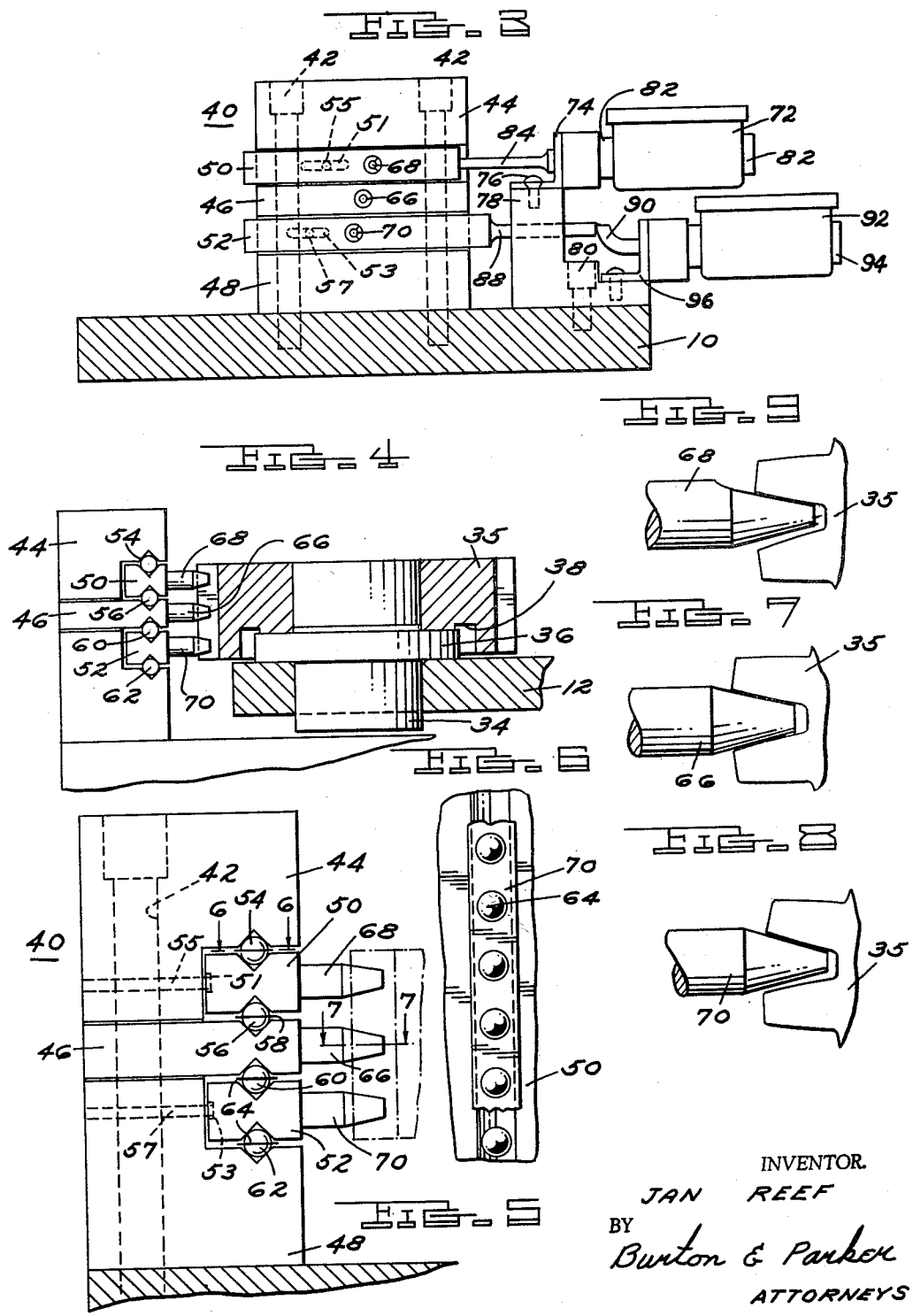

United States Patent Office  3,167,867
Patented Feb. 2, 1965

3,167,867
GEAR TEETH CHECKING GAGE
Jan Reef, 41520 8-Mile Road, Northville, Mich.
Filed July 25, 1962, Ser. No. 212,354
5 Claims. (Cl. 33—179.5)

This invention relates to a gage for checking gear teeth.

It is commonly referred to as a gage adapted for checking the lead angle of helical or spiral gear teeth, or checking the helix angle of such teeth, or for checking the gear tooth angle of ordinary spur gears or beveled gears. Such statement must be broadly interpreted, however, for actually the gage is employed merely for the purpose of indicating whether the gear teeth of a gear being checked by the gage correspond to gear teeth of a master gear which was used to set up the gage.

The primary object of the invention is the provision of a gage which is of simple inexpensive construction and readily usable by an average mechanic. It can be placed at the machine where gear cutting is being performed by a workman and a gear when so cut can be quickly and readily checked on the gage to determine whether it corresponds with a master gear that was used to set up the gage.

If there is error or absence of satisfactory correspondence, the gage will so indicate. It will not indicate just what the error is, but such gear can then be taken to another gaging device where the actual error can be determined and later corrected. This gage is for the purpose of quickly determining whether there is satisfactory correspondence with a master gear or not. In a sense it could be considered as a form of "Go-No Go" gear tooth gage.

Another object is the provision of a gage of a character hereinabove set forth which can be set to correspond with a determined master gear and upon which other gears may be easily and rapidly tested to determine whether they correspond satisfactorily with such master gear.

A feature of the construction is that, when a gear is checked on the gage, the correspondence or lack thereof as the case may be between the teeth of the gear being checked and the teeth of the master gear, is readily apparent to a workman and great skill is not required to check a gear on the gage.

Other objects, advantages, and meritorious features will more fully appear from the following description, claims, and accompanying drawings, wherein:

FIG. 1 is a front elevation of my gage;

FIG. 2 is a plan of the gage shown in FIG. 1;

FIG. 3 is a cross sectional view, partly in elevation, taken on the line 3—3 of FIG. 2;

FIG. 4 is a cross sectional view, partly in elevation, taken on the line 4—4 of FIG. 2;

FIG. 5 is a side elevation partly broken away of the gaging end of the gage structure;

FIG. 6 is a cross sectional view taken on line 6—6 of FIG. 5 showing the ball bearing support for one of the sliding blocks;

FIG. 7 is a fragmentary view taken on the line 7—7 of FIG. 5 through the middle pin shown in such figure;

FIG. 8 is a fragmentary view similar to that of FIG. 7 but with respect to the top pin of the three pins shown in FIG. 5; and FIG. 9 is a view similar to that of FIG. 7 except that it is with respect to the bottom pin of the three pins shown in FIG. 5.

In the figures, the gage includes a base 10, and a table or carriage 12, slidably supported upon the base for reciprocation between a pair of guide rails 14 and 16. These guide rails are secured to the base by screws 18. The guide rails are provided upon their opposed inner faces with linear ball bearing receiving grooves 20 and the carriage is provided along its opposite edges with opposed linearly extending ball bearing receiving grooves 22. A ball receiving race including a plurality of balls 24 supported by a ball carrier 26 is seated between each guide rail and the adjacent edges of the carriage. The balls of the ball races are received within opposed grooves of the rails and carriage and support the carriage spaced slightly above the base for free slidable movement as shown particularly in FIG. 1.

A stop pin 28 in the form of a screw is threaded through an upright support 30 secured to the base and such screw is adjustable to provide a stop to the forward movement of the carriage toward the gage checking means. A stop pin 32 is threaded into the base as shown in FIG. 1 and projects slightly above the upper surface thereof. It is adapted to engage a trunnion 34 mounted within the carriage and projecting slightly therebelow as shown in FIG. 1 to provide a stop to the rearward movement of the carriage.

The trunnion 34 is fixed in the carriage and extends therethrough as shown. It is illustrated best in FIG. 4 where the carriage 12 is shown in cross section and the trunnion 34 is illustrated as extending through the carriage and projecting below its bottom surface as described. The trunnion also projects above the top surface of the carriage as shown in FIG. 4 to receive a gear 35. The trunnion is provided with an annular shoulder 36 which projects radially over the top surface of the carriage and is received within a recessed portion 38 of a side face of a gear 35 as shown in FIG. 4. This shoulder supports the gear spaced above the upper surface of the carriage so as to facilitate rotation of the gear about the trunnion.

At the front end of the base there is an upright standard 40 made up of a stack of blocks secured together and to the base by two screws 42 extending therethrough and into base as shown in FIG. 2. There is an upper block 44, an intermediate block 46, and a bottom block 48. The upper block 44 is cut away immediately above the intermediate block 46 providing a recess into which a shiftable block 50 is received as shown in FIG. 5. The bottom block 48 is cut away immediately below the intermediate block providing a recess into which a shiftable block 52 is received as shown in the same figure.

The shiftable block 50 is supported for free slidable movement between an upper ball bearing race 54 and a lower ball bearing race 56. The balls of these two ball bearing races are received within opposed channels formed in the stationary blocks 44 and 46 and in the shiftable block 50. The balls of each race are mounted within a carrier strip 58 as shown in FIG. 5.

The shiftable block 52 is supported for free slidable movement between an upper ball bearing race 60 and a lower ball bearing race 62. The balls of these ball bearing races are received within opposed channels formed in the stationary blocks 46 and 48 and the shiftable block 52. The balls of each race are mounted within a carrier strip 64 as shown in FIG. 5. Each shiftable block is therefore freely slidable lengthwise.

The stationary intermediate block 46 is provided with a positioning pin 66 secured within the block and projecting normally outwardly therefrom toward the carriage as shown in FIGS. 2 and 4. Such pin is adapted to be received between two teeth of a gear mounted on the carriage 12 to position the gear. The upper slidable block 50 is provided with a checking pin 68 secured within the block and projecting normally outwardly therefrom toward the carriage to engage one side of a tooth of the gear mounted on the carriage as shown in FIGS. 2 and 4.

The lower slidable block 52 provided with a checking pin 70 secured within the block and projecting normally outwardly therefrom toward the carriage to engage one side of a tooth of the gear mounted on the carriage as shown in FIGS. 2 and 4. The two checking pins 60 and 70 are disposed on opposite sides, above and below respectively, and offset on opposite sides a vertical line through the positioning pin 66, as shown in FIG. 2.

Two dial indicators are provided, one for each slidable block. The uppermost dial indicator 72 is supported by a bracket 74. This bracket is secured by screw 76 to a block 78 secured to the base by a screw 80. The bracket 74 receives a supporting shaft 82 of the indicator to support the indicator. A plunger 84 which is coupled with the indicator needle 86 extends reciprocably through this shaft 82. The end of this plunger 84 is adapted to be contacted by the upper shiftable block 50 to be actuated thereby to swing the needle 86 of indicator 72.

The lower slidable block 52 has an extension 88 as shown in FIGS. 1 and 3. This extension is adapted to disconnectedly engage the curved end of a plunger 90 which plunger is coupled with the needle 86 of a dial indicator 92. This dial indicator 92 is carried by a stub shaft 94 which shaft is itself secured to a bracket 96, which bracket is mounted upon a part of the block 78 which is in turn secured to the base 10 by screw 80 as heretofore described and shown in FIG. 1.

The positioning pin 66 which is carried by the stationary intermediate block 46 is adapted to be received between two gear teeth of gear 35 as shown particularly in the enlarged fragment of FIG. 7. It seats against the opposed sides of the groove between two adjacent teeth and positions the gear 35 which gear is freely rotatably supported upon the trunnion 34. As shown in FIG. 4 such pin 66 engages the gear about midway between its two flat faces.

The gear teeth are shown as provided with arcuate faces, somewhat exaggerated in FIGS. 7, 8, and 9. The two checking pins, viz., the upper one 68 and the lower one 70 are disposed on opposite sides of the positioning pin 66 as shown in FIGS. 4, 5, and 2. They are so disposed that they are offset in opposite directions from the positioning pin 66 and are received within the same groove between the two spiral teeth of the gear engaged by positioning pin 66. The taper of each of the two pins 68 and 70 is cut away or relieved on one side so that these two pins engage only the same surface of the same gear tooth (note FIGS. 8 and 9), one above and the other below the positioning pin, all as shown in FIGS. 7, 8, and 9.

Therefore, when a gear is placed on the carriage and the carriage moved to bring the positioning pin 66 into place within the groove between two gear teeth, the two contacting pins will be brought into engagement with the same surface of the same gear tooth. It is the contour of this surface that will be indicated on the two indicator dials. The plunger of each indicator dial, which is coupled with the needle of the indicator, is spring biased outwardly so that such plunger is held resiliently against the end of its slidable block. The two plungers of the two dials are acted upon by the two slidable blocks when brought into contact therewith whereby the readings of the two dials may be observed by the workman.

It will be understood that a master gear for the particular type of gear being cut is first placed on the trunnion and the table moved to bring such gear into engagement with the positioning pin and the contact pins as shown in FIG. 2. The master gear is positioned properly by the positioning pin, and the master gear which has theretofore been determined to be accurate engages the two contact pins and each indicator dial is then set. The indicator needles may be set at zero to indicate this position.

The table is then withdrawn and the master gear removed. The gage is now set up accurately. It is now ready for use by a workman in checking other gears. When a gear is placed on the table, and the table moved to bring the gear into engagement with the three pins, the positioning pin will properly position the gear. The two contacting pins will engage the same face of the same gear tooth and if such face is not accurate a slidable block will be shifted and the needle of the dial indicator coupled with such block will reflect such deflection. The dial indicators will show whether the contour of the face of the gear tooth being measured is correct or out of line. If there is error shown to exist it will be indicated immediately and the gear can be taken to another gaging fixture to determine just what such error is and the extent thereof. It is therefore possible for a workman to quickly determine whether a gear is accurate or inaccurate. It therefore provides a ready "Go-No Go" gage for the teeth of a gear.

The upper slidable block 50 is provided (FIG. 5) with a channel 51 formed in its rear face and extending lengthwise of the block. The lower slidable block 52 is provided with a similar channel 53. Two stationary pins 55 and 57 are supported within the standard. Such pins project into these channels 51 and 53 to limit the endwise slidable movement of the blocks.

What I claim is:

1. A gage for checking gear teeth comprising, in combination, a base having a way for a gear carrying carriage, a gear carrying carriage mounted upon the way for slidable reciprocation, a gear positioning pin supported upon the base at one end of the way and projecting toward a gear carried by the carriage to enter the space between two gear teeth when the carriage is advanced over the way toward the pin, a gear tooth checking pin supported upon the base in proximity to the gear positioning pin and projecting toward the gear carried by the carriage to enter the space between two gear teeth and engage one of them when the positioning pin is received between its two gear teeth, said checking pin supported upon the base for shiftable movement in response to pressure thereagainst by said engaged gear tooth, an indicator coupled with said checking pin to be actuated thereby in response to shiftable movement of the pin upon pressure of a gear tooth thereagainst; and further characterized in that two shiftable checking pins are provided supported in proximity to the positioning pin and so aligned therewith as to enter the space between the same two teeth of the gear as the positioning pin, and said two checking pins are adapted to engage the same tooth to be acted upon thereby, and each checking pin is provided with its own indicator and coupled therewith to actuate the same in response to pressure thereagainst of a gear tooth.

2. A gage for checking gear teeth comprising, in combination, a base having a way for a gear carrying carriage, a gear carrying carriage mounted upon the way for slidable reciprocation, a gear positioning pin supported upon the base at one end of the way and projecting toward a gear carried by the carriage to enter the space between two gear teeth when the carriage is advanced over the way toward the pin, a gear tooth checking pin supported upon the base in proximity to the gear positioning pin and projecting toward the gear carried by the carriage to enter the space between two gear teeth and engage one of them when the positioning pin is received between its two gear teeth, said checking pin supported upon the base for shiftable movement in response to pressure thereagainst by said engaged gear tooth, an indicator coupled when said checking pin to be actuated thereby in response to shiftable movement of the pin upon pressure of a gear tooth thereagainst; and further characterized in that two shiftable checking pins are provided supported in such proximity to the positioning pin and so aligned therewith as to enter the space between the same two teeth of the gear as the positioning pin, and said two checking pins are adapted to engage the same tooth to be acted upon thereby, and each checking pin is provided with its own dial indicator and coupled therewith to actuate the same in response to shiftable movement of the pin upon pressure against its engaged gear tooth.

3. A gage for checking gear teeth as defined in claim 2 characterized in that an upright standard is mounted on the base at the end of the way, and said two checking pins are disposed in proximity to the positioning pin and on opposite sides thereof, and each checking pin is supported for shiftable movement by a block slidably mounted on the standard, and a dial indicator is provided for each checking pin and is disconnectedly coupled with the slidable block of the pin to be actuated thereby to register shiftable movement of the pin in response to engagement by a gear tooth.

4. A gage for checking gear teeth as defined in claim 3 characterized in that the carriage is supported upon ball bearings for guided movement within the way and each slidable block is supported upon ball bearings within the standard for guided shiftable movement toward and away from its dial indicator.

5. A gage for checking gear teeth as defined in claim 3 characterized in that each checking pin is tapered at its end to be received within the space between two gear teeth and one side of each pin is cut away so that when the gear is positioned by the positioning pin received within the space between two gear teeth the two checking pins engage one gear tooth only, and engage the same side of the tooth but engage the same on opposite sides of the positioning tooth.

References Cited in the file of this patent
UNITED STATES PATENTS

| | | |
|---|---|---|
| 1,281,805 | Metzger | Oct. 15, 1918 |
| 2,313,133 | Ernst | Mar. 9, 1943 |
| 2,775,041 | Pomernacki | Dec. 25, 1956 |
| 2,802,277 | Jaeger | Aug. 13, 1957 |
| 3,069,779 | Bauer | Dec. 25, 1962 |

FOREIGN PATENTS

| | | |
|---|---|---|
| 344,334 | Germany | Nov. 19, 1921 |